(12) United States Patent
Jaworski

(10) Patent No.: US 7,200,968 B2
(45) Date of Patent: Apr. 10, 2007

(54) PORTABLE SECURING ROD OR POLE HOLDER

(76) Inventor: Lonnie Jaworski, 2148 105th La. NW., Coon Rapids, MN (US) 55433

( * ) Notice: Subject to any disclaimer, the term of this patent is extended or adjusted under 35 U.S.C. 154(b) by 8 days.

(21) Appl. No.: 11/161,009

(22) Filed: Jul. 19, 2005

(65) Prior Publication Data

US 2007/0017142 A1    Jan. 25, 2007

(51) Int. Cl.
*A01K 97/10* (2006.01)
(52) U.S. Cl. ................. 43/21.2; 248/534; 248/539
(58) Field of Classification Search ............. 43/21.2; 248/511, 528, 534–536, 538, 539, 215, 227.4, 248/230.3, 231.41, 314; 224/922, 251, 674, 224/675
See application file for complete search history.

(56) References Cited

U.S. PATENT DOCUMENTS

| | | | | |
|---|---|---|---|---|
| 760,598 A * | 5/1904 | Wynegar | .................... | 248/511 |
| 1,520,543 A * | 12/1924 | Meachen | .................... | 43/21.2 |
| 1,750,605 A * | 3/1930 | Price | .................... | 248/229.14 |
| 1,760,346 A * | 5/1930 | Correa | .................... | 248/231.41 |
| 1,786,254 A * | 12/1930 | Meehan | .................... | 248/534 |
| 1,876,478 A * | 9/1932 | Van Duzer | .................... | 43/21.2 |
| 1,945,446 A * | 1/1934 | Madrak | .................... | 43/21.2 |
| 2,265,330 A * | 12/1941 | Waddle et al. | .................... | 43/21.2 |
| 2,399,435 A * | 4/1946 | Gregory | .................... | 248/538 |
| 2,541,146 A * | 2/1951 | Bahr | .................... | 248/538 |
| 2,681,195 A * | 6/1954 | Bradt et al. | .................... | 248/536 |
| 2,731,224 A * | 1/1956 | MacDonald | .................... | 248/511 |
| 2,838,263 A * | 6/1958 | Drewrys | .................... | 248/539 |
| 2,934,849 A * | 5/1960 | Kampa | .................... | 43/21.2 |
| 3,089,674 A * | 5/1963 | Bastie | .................... | 248/534 |
| 3,240,455 A * | 3/1966 | Swezy et al. | .................... | 248/539 |
| 3,282,482 A * | 11/1966 | Scharsu | .................... | 224/922 |
| 3,470,648 A * | 10/1969 | Bowker | .................... | 43/21.2 |
| 3,484,066 A * | 12/1969 | Aunspaugh | .................... | 43/21.2 |
| 3,565,303 A * | 2/1971 | Kippen | .................... | 224/675 |
| 3,655,155 A * | 4/1972 | Taylor | .................... | 43/21.2 |
| 3,708,141 A * | 1/1973 | Friedgen et al. | .................... | 248/314 |
| 3,783,547 A * | 1/1974 | Bystrom et al. | .................... | 43/21.2 |
| 3,885,721 A * | 5/1975 | Vanus | .................... | 224/922 |
| 3,966,151 A * | 6/1976 | Hawkins, III | .................... | 43/21.2 |
| 4,064,811 A * | 12/1977 | Copeland | .................... | 43/21.2 |
| 4,098,479 A * | 7/1978 | Hartstone et al. | .................... | 248/214 |
| 4,156,982 A * | 6/1979 | Phillips, Jr. | .................... | 43/21.2 |
| 4,270,724 A * | 6/1981 | McMullen | .................... | 248/534 |
| 4,526,333 A * | 7/1985 | Nakama et al. | .................... | 248/229.12 |
| 4,528,768 A * | 7/1985 | Anderson | .................... | 43/21.2 |
| 4,603,499 A * | 8/1986 | Simborski | .................... | 43/21.2 |

(Continued)

FOREIGN PATENT DOCUMENTS

GB      2380223 A * 4/2003

(Continued)

*Primary Examiner*—Darren W. Ark
(74) *Attorney, Agent, or Firm*—Louis Ventre, Jr.

(57) ABSTRACT

A holder, a method of using the holder and a method of making the holder, for securely retaining a tool, pole or fishing rod without damaging the support, such holder comprises a main body and a clip. The main body has a hollow cylinder section (10); an ell-shaped tang section (20) at the top of the cylinder, ridge steps (22) on the tang section; and a rail section (30) formed on the exterior cylinder wall. The clip (70) has a snap (71) on one end and channel guides (72) at the other end to fit within the rail section (30). The clip slidably engages the rail section (30) and tang section (20) and is secured in place by closing the snap (71) on the ridge steps (22). The holder is made by an injection molding process using commercially available plastic resins.

8 Claims, 3 Drawing Sheets

U.S. PATENT DOCUMENTS

| | | | |
|---|---|---|---|
| 4,650,146 A * | 3/1987 | Duke | 43/21.2 |
| 4,662,552 A * | 5/1987 | Uyehara | 224/251 |
| 4,682,438 A * | 7/1987 | Arrow | 43/21.2 |
| 4,852,291 A * | 8/1989 | Mengo | 43/21.2 |
| 4,858,869 A * | 8/1989 | Stang | 248/314 |
| 4,871,099 A * | 10/1989 | Bogar, Jr. | 43/21.2 |
| 4,907,729 A * | 3/1990 | Hess, III | 224/675 |
| 4,949,498 A * | 8/1990 | Cecchetti | 43/21.2 |
| 4,951,857 A * | 8/1990 | Carr | 224/230 |
| 4,998,277 A * | 3/1991 | Rioux, Jr. | 248/214 |
| 4,998,700 A * | 3/1991 | McKaig | 248/214 |
| 5,054,229 A * | 10/1991 | Hughes | 43/21.2 |
| 5,163,652 A * | 11/1992 | King | 43/21.2 |
| 5,187,892 A * | 2/1993 | Gutierrez | 43/21.2 |
| 5,210,971 A * | 5/1993 | Efantis | 43/21.2 |
| 5,217,151 A * | 6/1993 | Parsons | 224/672 |
| 5,232,137 A * | 8/1993 | Devine | 248/311.3 |
| 5,383,793 A * | 1/1995 | Hsu et al. | 248/316.4 |
| 5,511,336 A * | 4/1996 | Bishop | 43/21.2 |
| 5,560,137 A * | 10/1996 | Herring | 43/21.2 |
| 5,561,937 A * | 10/1996 | Johnson | 43/21.2 |
| 5,617,980 A * | 4/1997 | Parsons et al. | 224/914 |
| 5,697,183 A * | 12/1997 | Walker | 43/21.2 |
| 5,915,942 A * | 6/1999 | Ratliffe | 43/21.2 |
| 6,088,946 A * | 7/2000 | Simmons | 43/21.2 |
| 6,276,651 B1 * | 8/2001 | Dolan | 248/538 |
| 6,318,017 B1 | 11/2001 | Genardo | 43/21.2 |
| 6,341,756 B1 | 1/2002 | Morris | 248/530 |
| 6,381,897 B1 | 5/2002 | Walsh | 43/21.2 |
| 6,575,416 B1 * | 6/2003 | Avinger | 248/215 |
| 6,588,639 B2 * | 7/2003 | Beletsky et al. | 224/674 |
| 6,672,559 B1 * | 1/2004 | Boldia | 248/538 |
| 6,718,682 B1 * | 4/2004 | Seitsinger et al. | 43/21.2 |
| 6,802,150 B2 | 10/2004 | Harden | 43/21.2 |
| 6,857,608 B2 * | 2/2005 | Avinger | 248/215 |
| 6,898,893 B1 * | 5/2005 | Mukdaprakorn | 43/21.2 |
| 6,948,877 B1 * | 9/2005 | Lo | 248/534 |
| 6,962,018 B1 * | 11/2005 | King | 43/21.2 |
| 2002/0096610 A1 * | 7/2002 | Fernandez | 248/218.4 |
| 2004/0051015 A1 * | 3/2004 | Ohrling | 248/214 |
| 2005/0126063 A1 * | 6/2005 | Bowerman | 43/21.2 |
| 2006/0076377 A1 * | 4/2006 | Moodie | 224/251 |
| 2006/0265934 A1 * | 11/2006 | Morris | 43/21.2 |

FOREIGN PATENT DOCUMENTS

| | | | |
|---|---|---|---|
| JP | 2-234625 A * | 9/1990 | |
| JP | 9-201154 A * | 8/1997 | |
| JP | 10-136855 A * | 5/1998 | |
| JP | 11-46653 A * | 2/1999 | |
| JP | 11-220992 A * | 8/1999 | |
| JP | 2000-32896 A * | 2/2000 | |
| JP | 2002-218891 A * | 8/2002 | |
| JP | 2005-204522 A * | 8/2005 | |
| JP | 2006-101846 A * | 4/2006 | |

* cited by examiner

PORTABLE SECURING ROD OR POLE HOLDER

FIELD OF INVENTION

In the field of portable holders, a lightweight, inexpensive, portable holder of the tube type that may be easily attached to a support, typically a horizontal railing, and thereafter securely retain a tool, pole or fishing rod without damaging the support. As a tool holder, a typical support would be a belt or a railing on a scaffold, a ladder, a fence, a bench on a dock, or the walls of truck having an accessible railing. As a fishing rod holder, a typical support would be a horizontal railing at a pier or dock.

DESCRIPTION OF PRIOR ART

Tubular holders, most commonly tubular fishing rod holders, are the simplest form of holders. Generally, the tubular holders are cylindrical and may be tapered or straight along the cylinder's longitudinal axis. Any rod, pole, brush, or staff that can fit into the tube can be held in place typically by operation of gravity, as is the case with the present invention.

A primary application for the present invention is as a fishing rod holder and many of the benefits in using it as a fishing rod holder also apply to other uses. For convenience of discussion, the primary example will be to a fishing rod holder. Those skilled in the art will appreciate that the inventive device may be configured for various alternative uses that are within the overall teachings of this disclosure.

When someone is fishing, there are times that the rods or poles employed must be idled, without the person holding the rod or pole. For example, such times typically occur when retrieving bait, securing prior catches, and in rest breaks. Without a holder, the rods or poles are left employed in use, but in an unsecured fashion. This provides the opportunity for a fish to strike and the person to lose an investment in the sport.

Tubular fishing rod holders are well known and generally vary by the means for securing or fixing the position of the holder. For example, U.S. Pat. No. 6,341,756 to Morris on Jan. 29, 2002 is a typical tube holder for a fishing rod. The '756 patent has a tubular body and a spike at the bottom for penetrating the ground to fix the location of the holder and the angle of the rod with respect to the surface of the water. For the '756 patent, the means for fixing the position of the holder is the spike, which must be inserted into the ground. The present invention does not utilize a spike.

Portable rod holders for pier or dock fishing in the prior art are often too costly, too complicated, too heavy, or tend to be clamped in such a manner as to damage the railing or pier to which it is attached. None in the prior art has been found that has only two moving parts that slide together easily and with minimal effort to form a secure attachment to a railing, are lightweight, inexpensive, and will not damage a railing when so attached.

Portable and fixed location fishing rod holders are well known. U.S. Pat. No. 6,802,172 to Harden on Oct. 12, 2004 is an example of a fixed location holder. Essentially, this design is simple, but requires that it be permanently fixed in location. The present invention involves portable fishing rod holders.

Some portable fishing rod holders are mechanical devices that attempt to be universal in the fishing locales where they can be employed. Adding to the cost are multiple components such as threaded screws, knuckles for repositioning holding angles, adjustment wheels, heavy jaws to grip a rail, and ground deployment stakes. U.S. Pat. No. 6,898,893 to Mukdaprakorn on May 31, 2005 is an example of the latest of this kind of rod holder. U.S. Pat. No. 4,528,768 to Anderson on Jul. 16, 1985 is another example of a tubular holder using threaded metal rods, thumbscrews and a moveable jaw to forcibly clamp down on a rail.

The present invention is much of what the '893 and '768 patents are not. No tools are required to secure the device to the structure and little force is required to fasten it to a structure. It is an object of the present invention to provide a lightweight, low cost, simple rod holder that works best on a horizontal pier railing.

It is important that the holder be lightweight to permit a fisherman to carry one or more of the holders with the least amount of difficulty.

It is important that the holder be low cost to serve the largest market and promote the sport of fishing.

And, it is important that the holder be simple in its deployment so that a child could quickly and effortlessly set it up on a pier railing, without having to use tools or an adult's strength to employ the clamp.

The present invention is a holder having only two separable components: a main body and a clip that slidably attach to each other around a railing in a manner that a child could easily accomplish.

Perhaps as importantly, the present invention does not employ metal jaws to grip a rail. It does not require making holes or other modifications to the support structure in order to use this device. Rather the adjustable locking mechanism fastens to a support structure or railing by surrounding it and does so, without marring that structure with teeth marks or damaging it in securing the holder in place.

Fishing rod holders in the prior art often have a pivoting capability to set a desirable angle of the rod with the water or to enable the user to easily extract the rod when installed at an elevated location. The '893 patent noted above is a pivoting holder addressing the desired angle and U.S. Pat. No. 6,381,897 to Walsh on May 7, 2002 is an example of a pivoting holder that may be installed on a elevated location on a boat and then pivotally released to allow someone standing below it on the deck to extract the rod. The present invention is not a pivoting rod holder. It is designed to be fixed in place and securely hold a rod in the most favorable position when fishing from a pier or dock. In addition, it holds the added advantage that it can be quickly and easily moved to and from any location that the person would like to fish from on a dock or pier.

One of the design goals for rod holders is preventing the rod from being pulled into the water and lost when a fish strikes a line. Pivoting holders can accidentally rotate in the direction of the force and be pulled into the water. Looped support wires are sometimes employed in holders to secure a rod. U.S. Pat. No. 6,718,682 to Seitsinger on Apr. 13, 2004 is an example of a looped wire wherein the rod must be rotated in a direction away from a striking fish in order to extract the rod from the holder. An attached safety hook has been used to lock a rod to the holder and U.S. Pat. No. 6,318,017 to Genardo on Nov. 20, 2001 teaches such use.

The present invention does not employ any safety hook or other mechanical device to secure the rod in the holder. Nor is the present invention susceptible to accidental pivoting. Once the adjustable locking mechanism of the present invention is employed and the holder is fastened to a support structure, the holder is then locked in a fixed position, which is typically vertical with respect to the pier or dock. The rod is, therefore, upright in the holder. When a fish strikes the fishing rod line, the holder is at an angle such that the force from a striking fish pulls the rod further into the holder, rather than out of the holder. In addition, the adjustable locking mechanism prevents the rod holder from detaching from the structure regardless of the direction of the force applied by the rod or pole when a fish has been secured. The simple design of the present invention takes full advantage of natural forces to improve the functionality of the holder.

The upright position of the rod in using the present invention also protects the fisherman's investment in rods and poles by resisting stress or forces caused by fish that are caught while not actively holding the rod or pole. Fish often "run" from side to side to resist capture and this flexing action can defeat a large number of rod or pole holders on the market. Regardless of the direction or the force exerted on the device via the rod or pole, the present holder will safely resist the forces from the catch and will not allow the rod or pole to become unseated from the holder.

Corrosion is a well-known detrimental effect on fishing gear. Much of the prior art in holders use metal parts that are subject to the detrimental effects of corrosion. Embodiments that employ non-corrosive metals are expensive and heavy. The '768 to Anderson mentioned above is an example of a tubular holder employing metal clamps, threaded rods, thumbscrews and pivot parts that are subject to corrosion and high cost.

The preferred embodiment of the present invention employs no metallic pieces common in other designs and prone to salt water corrosion or damage with exposure to the water environment. It is made entirely of plastic.

Ease of manufacturing is a desirable goal for any product, and is one of the objects of the present invention.

One of the easiest to manufacture holders in the prior art is a tubular holder with no moving parts. While this is the simplest in form, it suffers from a lack of portability and ease of attachment. U.S. Pat. No. 6,802,172 to Harden on Oct. 12, 2004 is an example of a holder with no moving parts, that is, a holder being an elongated hollow tubular body with a continuous irregular slit through the length of the tube. The irregular slit permits the rod to be pulled out of the holder only when in a particular orientation and its single body design makes it relatively easy to manufacture. However, the '172 patent has no convenient means for portable attachment and it lacks the ability to be attached without altering the support structure. To be used, it must either be molded into the shell of a boat or secured with the usual mechanical means, such as screws, glue, nails or clamps provided by the user.

The present invention has been designed to be easy to manufacture in mass quantities, yet provide portability, ease of use, non-damaging attachment and all of the other features satisfying the objects of its design discussed above. The present invention has only two moving parts, which are easily molded into shape by an injection molding manufacturing process. Plastic resin materials that are well known in the art to be lightweight, strong and weather resistant are used.

It is therefore apparent that a need exists for a portable holder for a tool, pole or fishing rod that is easy to manufacture, lightweight, inexpensive, easily fixed to a support, and will securely retain the tool, pole or fishing rod without damaging the support or the tool, pole or fishing rod. It is further apparent that there is utility in a holder that will allow a fisherman to utilize a number of fishing rods or poles, take rest breaks or perform other activities without subjecting his investment to the risk of loss if a fish should bite, and allows the person to select new fishing locations without the complication of removing bolts or other apparatus that require tools.

BRIEF SUMMARY OF THE INVENTION

A holder, a method of using the holder and a method of making the holder, for securely retaining a tool, pole or fishing rod without damaging the support, such holder comprises a main body and a clip. The main body has a hollow cylinder section; an L-shaped tang section at the top of the cylinder, ridge steps on the tang section; and a rail section formed on the exterior cylinder wall. The clip has a snap on one end and channel guides at the other end to fit within the rail section and add additional strength to the holder.

The clip slidably engages the rail section and tang section and is secured in place by closing the snap on the ridge steps. The holder is made by an injection molding process using commercially available plastic resins.

DETAILED DESCRIPTION OF THE INVENTION

Figure 2:
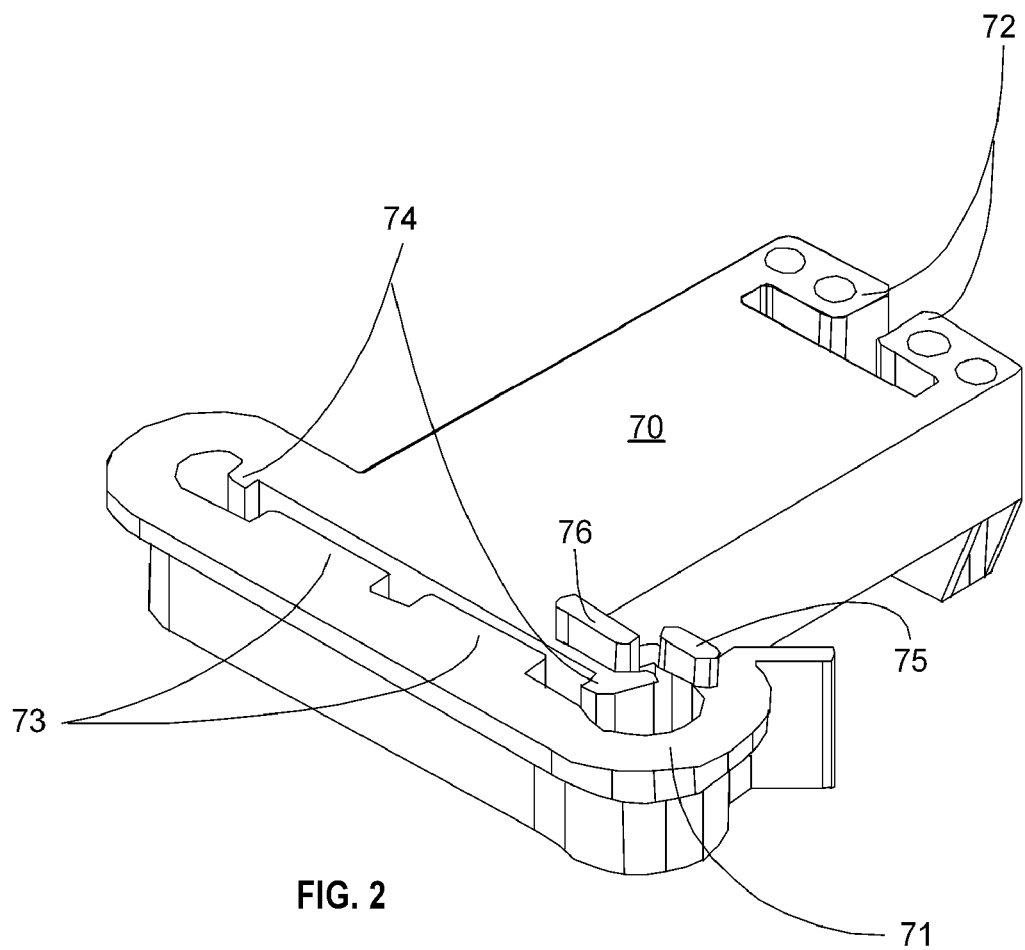
FIG. 2 is a perspective view of the bottom of the clip.
Figure 3:
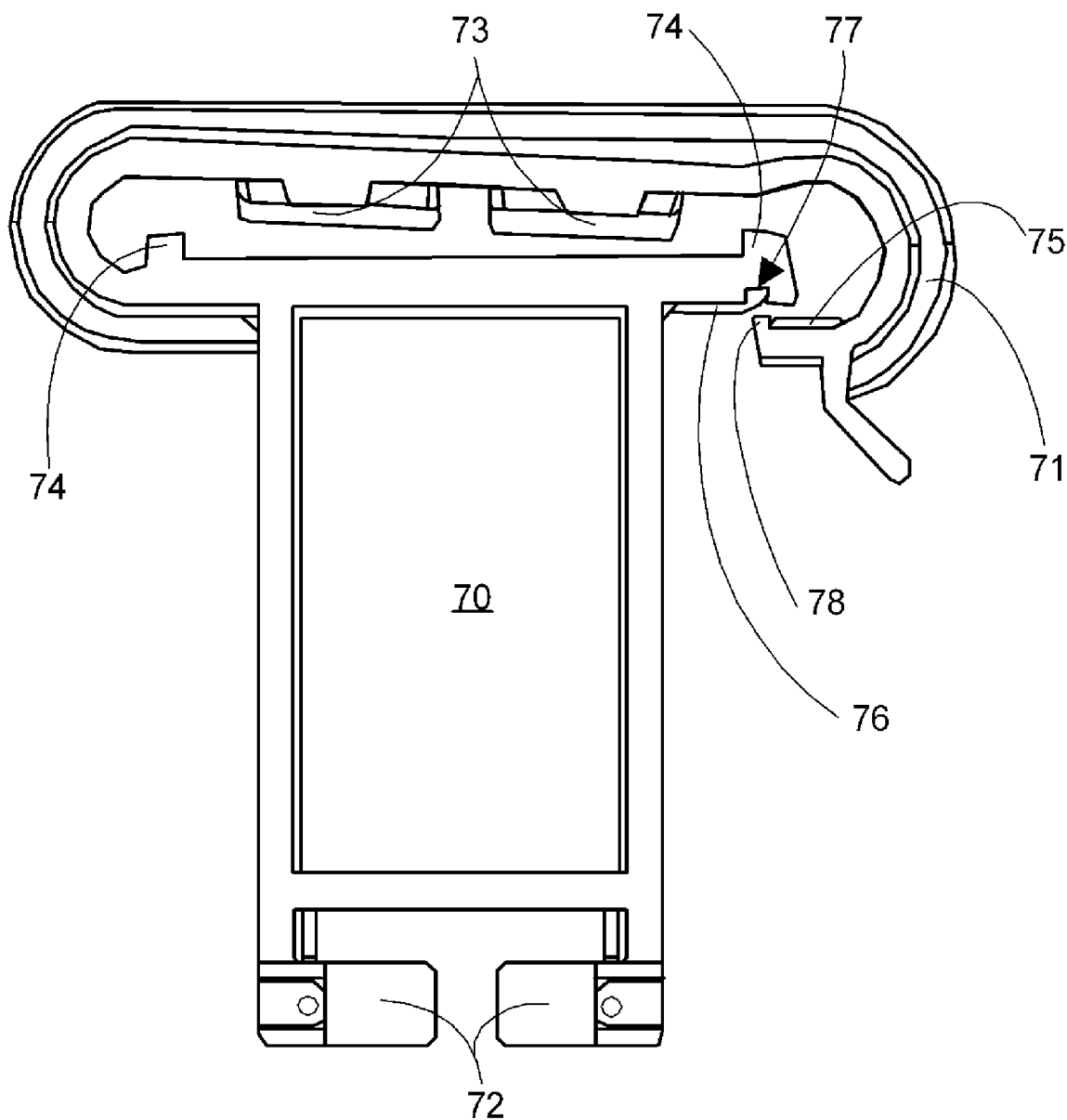
FIG. 3 is a top view of the clip
Figure 4:
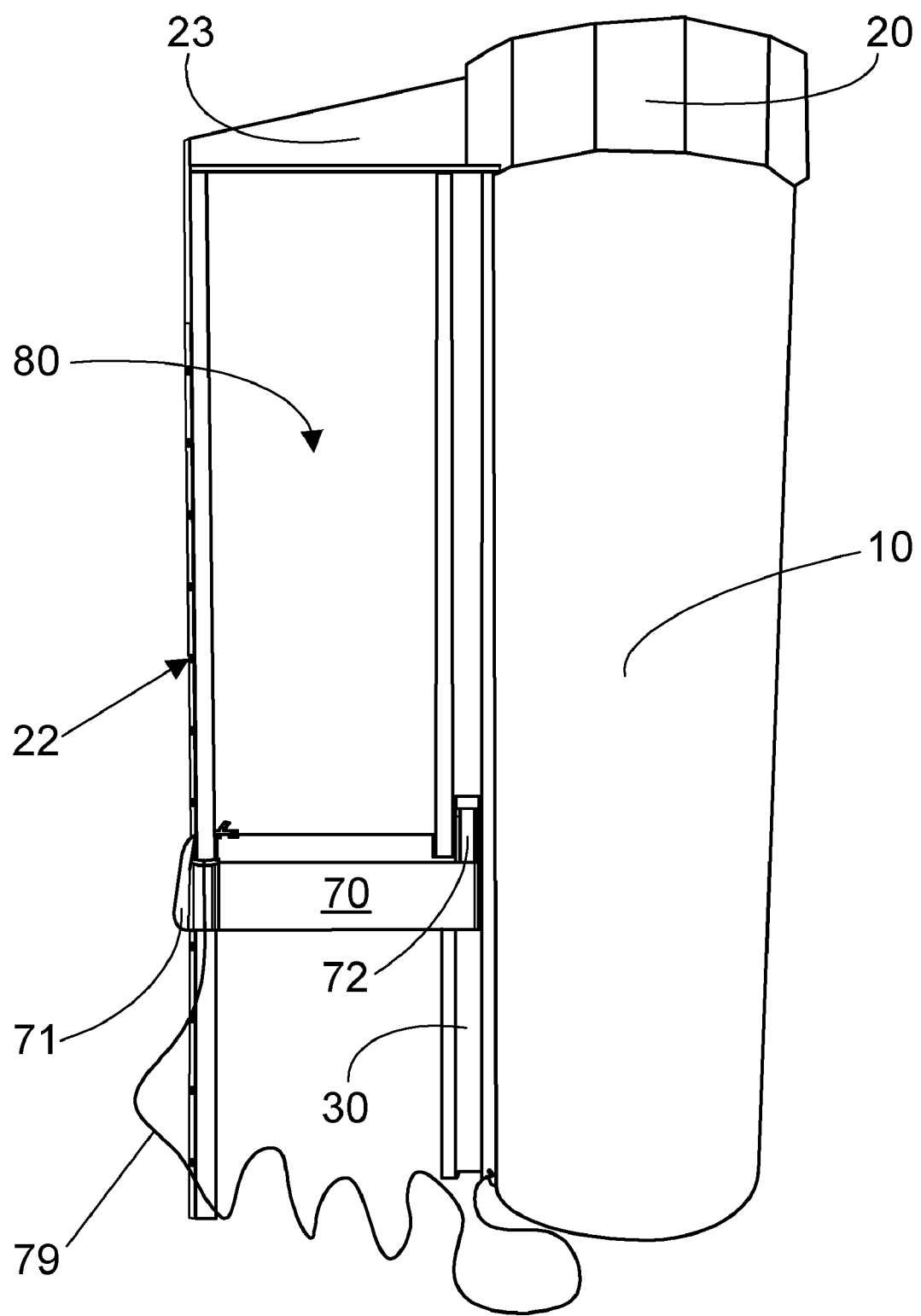
FIG. 4 is a side view of the holder with the clip engaged.

FIGS. 1, 2, 3 and 4 show aspects of the preferred embodiment of a portable tubular-type holder for securely retaining a tool, pole or fishing rod without damaging a railing or support to which it is installed. The holder comes in two parts, a main body shown in FIG. 1 and a clip (70) shown in FIG. 2 and FIG. 3. FIG. 4 shows the assembled holder with the two parts engaged and locked together.

Figure 1:
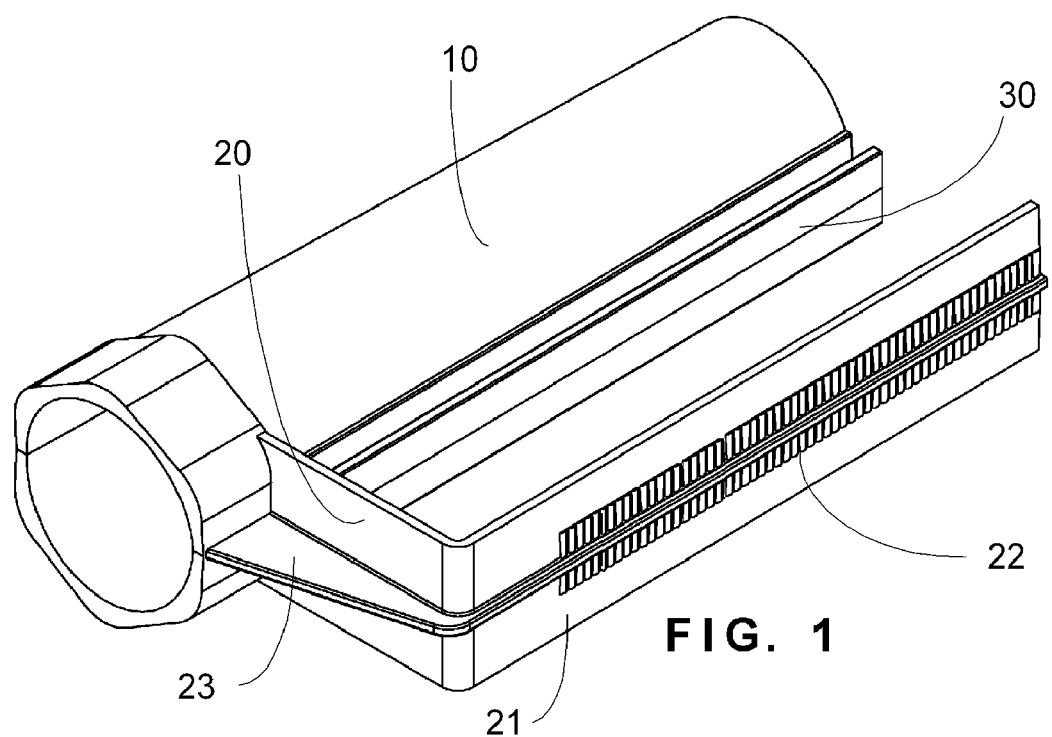
FIG. 1 is a perspective view of the cylinder, tang and rail.

FIG. 1 shows the main body of the holder, which is fabricated as an integral unit. The main body is composed of a tube or cylinder section (10), a rail section (30) and an L-shaped tang section (20) having ridge steps (22). The tube or cylinder section (10) is the component that receives the object being held. The fishing rod is used as the primary example in explaining the invention.

In use, the main body fits over a horizontal railing, typically a two by four, two by six or a two by eight board on a fence at the water's edge of a pier or dock. While these boards are typical, the scope of the invention includes any width or thickness of board, which may be best accommodated by changing the width and length of the tang section.

In using the holder the board would be located in an area (80), shown in FIG. 3, between the cylinder section (10) and the part of the tang section (20) so that the holder is vertical and a fishing rod inserted at the top of the holder stands upright against the fence.

The holder is secured by a clip (70), shown in FIGS. 2, 3 and 4. In the method of using the invention, the clip is slidably engaged on the rail section (30) and on the tang section (20) so that it snugs up against the bottom of the railing.

The clip has channel guides (72) that extend above the face of the clip to add additional strength to the holder when the channel guides are engaged in the rail. The channel guides (72) slidably engage the rail section (30) from the bottom of the rail.

The clip (70) has a means for slidably engaging the tang section (20) at the end opposite the channel guides (72). In the preferred embodiment shown in FIG. 2, this means is a snap (71). The snap has nubs (73) that lock against the ridge steps (22) when the snap is pushed closed. Once the snap (71) is pushed closed against the ridge steps (22), the holder is secured in place on the railing.

In an alternate embodiment, the means for slidably engaging the tang section is a simple slot near the tang end of the clip. For this embodiment, there is an alternate means for locking the clip in place. One such alternative means for locking the clip in place is a flexible tab that automatically clicks to lock the bottom edge of the tab against the ridge steps as the clip is raised on the tang. The flexible tab is released by pressing on the opposite end to rotate the locking end away from the ridge steps.

FIG. 4 shows the clip (70) engaged on the tang section (20) over the ridge steps (22) and engaged on the rail section (30). The area (80) above the clip between the tang section and the rail section (30) is the place where the horizontal board would be when the clip (70) is employed on the railing of a pier or dock fence.

The cylinder section (10) may be a right circular cylindrical body or may be tapered. In the preferred embodiment shown in FIG. 4, the cylinder section (10) is tapered at a 2 percent angle from a wider top to a narrower bottom. In application any taper or no taper at all may be employed in the cylinder section.

In the preferred embodiment shown in FIG. 1, the tang section (20) has a reinforced top area at the cylinder section (10). A wedge shape extension (23) at the top area provides structural stability and added strength to resisting torsional and other forces on holder when in use. The longitudinal extension of the tang section (20) is reinforced by a center rib (21) extending from the wedge shape extension (23) down along the length of the longitudinal extension. The tang section has ridge steps (22) on the outer face of the longitudinal extension. The ridge steps (22) serve to receive the snap (71) and help lock the clip (70) in place on the tang section.

In the preferred embodiment shown in FIG. 2, the clip is a single unit. The clip has a snap (71) on one end, which is designed to fit over the tang section (20). At the other end of the clip, there are two channel guides (72), which are designed to mate with the rail section (30).

The snap (71) has a rib (78) that joinably mates with an indentation channel (77) when the snap is pushed closed. The snap (71) has a first vertical stop (75), which adds strength to the rib and snap after it is pushed closed. The first vertical stop helps prevent a dislodging flexure of the rib that could unintentionally open the snap during use, for example during rigorous flexing of the holder during a fish strike on an unattended rod.

A second vertical stop (76) spanning the bottom of the indentation channel (77) on the clip, which receives the rib (78) on the snap upon closure, adds strength to the walls of the indentation channel and further serves as a bottom floor to sliding motion of the rib in the indentation channel once the snap is closed. This second vertical stop (76) prevents the snap from accidentally slidably disengaging; for example, during rigorous flexing of the holder during a fish strike on an unattended rod. A similar stop on the opposite end of the indentation channel (77) is not needed because the additional strength is not required and the support or board to which the holder is attached when it is in use prevents the rib (78) from sliding out of the upper opening of the indentation.

The inner face of the snap has two nubs (73) that are designed to fit against the ridge steps (22) on both sides of the center rib. In use, the snap in the open position is slid on the tang section (20) while the other end is slid into the rail section (30). The clip is then slid up against the board or support railing. Then, the snap (71) is pushed closed to lock the clip (70) on the ridge steps (22). This process secures the holder to the board or other support railing.

In alternative embodiments, there is a means for attaching the clip to the main body when the clip is not engaged in the tang section (20) or rail section (30), thereby preventing the clip from being lost when not in use. Such means must not otherwise interfere with the process of using the holder. In one such embodiment, such means for attaching is a thin plastic line (79), as shown in FIG. 4, created in the mold between the clip and the main body. In another such embodiment, such means for attaching is a fishing line tying the two parts together.

In the preferred method of making the holder, the main body and the clip are injection molded into their final form. A mold consisting of two halves is typically made from tool steel. When the two halves of the mold are joined together it creates a hollow impression of the holder. Plastic resin heated to a molten state is then injected into the mold filling the impression with the molten plastic resin. The filled mold is then allowed to cool until the plastic hardens, which is typically over a period of about a few minutes. The two halves of the mold are then separated and the holder is extracted from the mold. Typically, this process utilizes a plastic injection-molding machine. There are a variety of suitable plastic resin materials, well known in the art, that are lightweight yet very durable and resistant to degradation in the environments found when fishing in saltwater and freshwater.

In the method of using the holder, the main body is placed over a board, plank or support, typically a railing, so that the railing is between the tang section and the cylinder section and the holder is generally in a vertical position with respect to the ground and generally in the location where the person desires to fish. Then the clip (70) is slidably engaged to the main body via the rail section (30) and tang section (20) and slid to a position against the bottom of the railing. The snap (71) on the clip (70) is then pushed closed, that is snapped into place, so that the nubs (73) engage the ridge steps (22) and the main body is secured to the railing. A rod or pole is then simply inserted into the cylinder opening at the top of the holder.

Although the description above contains many uses, these should not be construed as limiting the scope of the invention but as merely providing illustrations of some of the embodiments of this invention. Thus, the scope of the invention is determined by the appended claims and their legal equivalents rather than by the examples given.

What is claimed is:

1. A holder comprising:
   a main body having
      a cylinder section having a top end and a bottom end,
      a rail section attached to the cylinder section along an outer longitudinal surface of the cylinder section such that a longitudinal axis of the cylinder section is parallel to a longitudinal axis of the rail section, and
      an L-shaped tang section with a first portion having a first end attached to the top end of the cylinder section and extending transversely outwardly therefrom to a second end, and a second portion formed to the second end and extending substantially parallel to the cylinder and rail sections and wherein the second has ridge steps and defines an open area between the second portion and the cylinder section which is located between the first portion and the bottom end of the cylinder section; and, a clip having channel guides on a first end of the clip to slidably engage the rail section, a means for slidably engaging the tang section on a second opposing end of the clip, and means for locking the clip in place, wherein in use, the channel guides are slidably engaged with the rail section by positioning the rail section within the channel guides and the means for slidably engaging the tang section are slidably engaged with the second portion of the L-shaped tang section by positioning the second portion of the L-shaped tang section within the means for slidably engaging the tang section.

2. The holder of claim 1 wherein the means for slidably engaging the tang section is a slot-at the second end of the clip and the means for locking the clip in place is a flexible tab that automatically clicks to lock a bottom edge of the tab against the ridge steps as the clip is raised on the tang section.

3. The holder of claim 1 further comprising a means for attaching the clip to the main body when the clip is not engaged in the rail section or the tang section.

4. The holder of claim 1 wherein the cylinder is tapered so that it is wider towards the top end than towards the bottom end.

5. The holder of claim 1 wherein the tang section has a reinforced top area at the cylinder section, a wedge-shaped extension at the top area, and a center rib extending from the wedge shaped extension down along a length of the tang section.

6. The holder of claim 1 wherein the means for slidably engaging the tang section and the means for locking the clip in place comprises a closable snap having nubs that locks against the ridge steps when closed.

7. The holder of claim 6 wherein the snap further comprises a rib that joinably mates with an indentation channel when the snap is pushed closed; a first vertical stop to add strength to the snap after it is pushed closed; and a second vertical stop spanning the bottom of the indentation channel to add strength to the clip and to prevent slidable disengagement of the rib from the indentation channel.

8. A method of using the holder of claim 7 comprising the steps of, placing the main body over a railing so that the railing is between the tang section and the cylinder section and the holder is approximately vertical with respect to the ground;

connecting the rail section and the tang section by slidably engaging the clip on the rail section and the tang section and moving it to a position against the bottom of a railing; and, closing the snap against the ridge steps to lock the clip in place.

* * * * *